United States Patent Office.

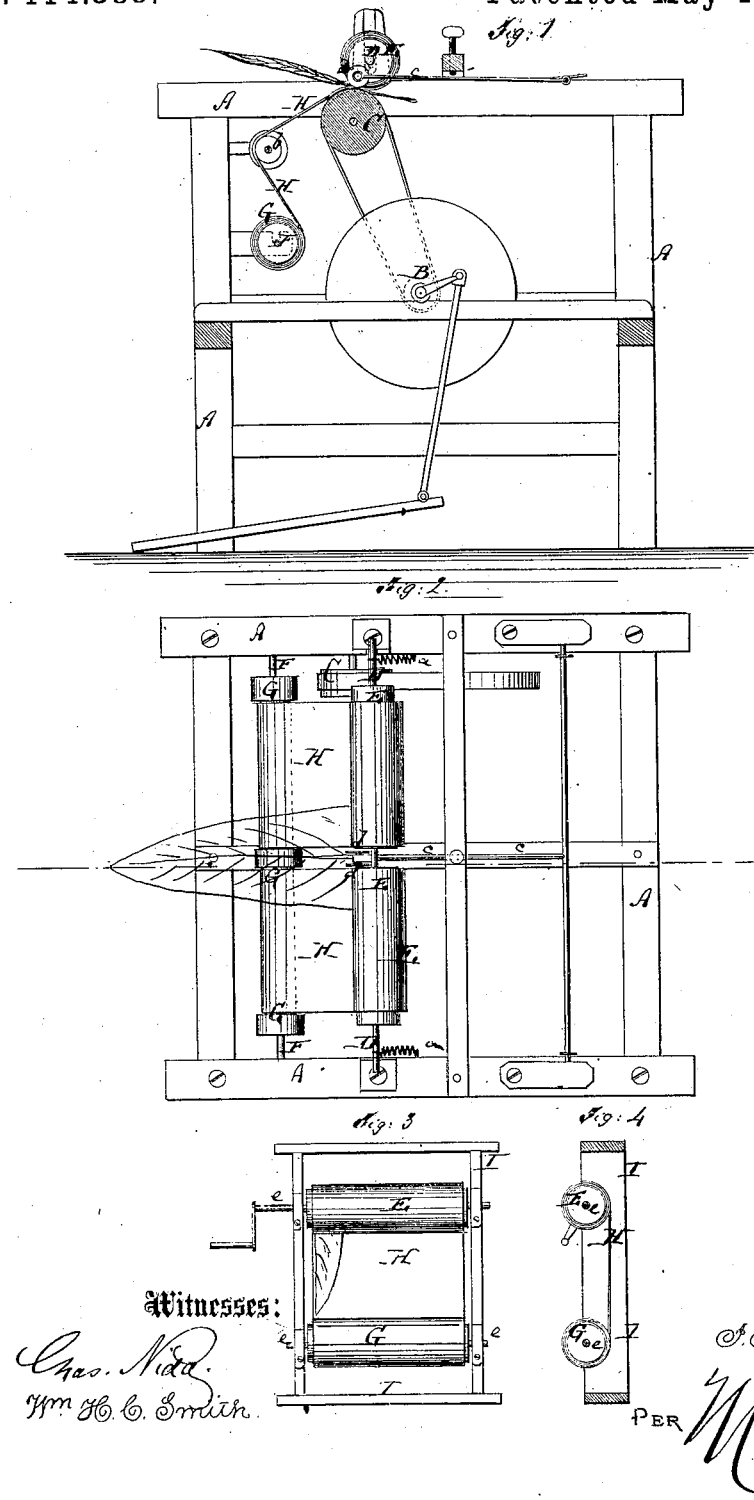

JOHN R. TUNNICLIFF, OF VAN HORNESVILLE, NEW YORK.

Letters Patent No. 114,888, dated May 16, 1871.

---

IMPROVEMENT IN MACHINES FOR STRIPPING AND BOOKING TOBACCO.

---

The Schedule referred to in these Letters Patent and making part of the same.

---

*To all whom it may concern:*

Be it known that I, JOHN R. TUNNICLIFF, of Van Hornesville, in the county of Herkimer and State of New York, have invented a new and improved Machine for Stripping and Booking Tobacco; and I do hereby declare that the following is a full, clear, and exact description thereof, which will enable others skilled in the art to make and use the same, reference being had to the accompanying drawing forming part of this specification.

Figure 1 represents a vertical section of my improved booking and stripping-machine.

Figure 2 is a plan or top view of the same.

Figure 3 is a face view of the booking-rack.

Figure 4 is a transverse section of the same.

Similar letters of reference indicate corresponding parts.

This invention has for its object to provide a machine whereby the leaves of the tobacco-plant may be "stripped" and "booked" without difficult manual operation and loss of material.

Tobacco, for use in cigars, is at present stripped by hand—*i. e.*, deprived of its stem by tearing the same out. This operation is laborious and uncertain, as it often causes the leaves to be torn and their edges to be serrated.

After having been stripped the leaves are stretched by hand, and placed one upon another until a sufficient number has been collected to form a "book," which is tied and thus kept ready for use.

This process of stretching is not only imperfect but also insufficient: imperfect, because the hands do not reach and stretch all parts of the leaves, leaving some portions wrinkled and rough; insufficient, because after the book is opened the cigar-maker has to re-stretch each leaf before cutting the wrappers from it.

My machine serves to cleanly cut out the stem and to nicely stretch each leaf and retain it in a stretched state and moist, ready for use.

A in the drawing represents the frame of my improved machine.

The same contains a shaft, B, which receives rotary motion by a belt, treadle, or other suitable mechanism, and imparts it to a horizontal drum, C, whereby it is further transmitted to the other machinery.

In the frame A is also hung a transverse shaft, D, which receives two drums, E E, that are fitted upon it so that they may be removed.

Springs *a a* apply to the shaft D to hold the drums E in contact with C, so that they will thereby be revolved.

Another shaft, F, hung in the frame A, receives also two removable drums, G, similar to E.

The drums E E are connected with the drums G G, respectively, by means of aprons H, which are at the beginning of the operation wound upon G, and thence gradually transferred to E.

The aprons H are laid over a roller, *b*, whereby they are properly stretched.

Between the two drums E E is space enough to admit a rod, *c*, which carries two small revolving cutters, *d d*.

The leaf to be treated is so applied that its stem is held upon the drum C, between the cutters *d d*.

As the drum C revolves it will draw the leaf between the aprons H and drums E E, and the knives *d d* cut out the stem; the stem is discharged between the drums E E; the remaining halves of each leaf are wound onto the drum E, and held thereon by the aprons, a fresh leaf being applied as quick as one has been wound up.

When the aprons have been entirely wound upon the drums E the latter are removed from the shaft D, and the rollers G from F, and new rollers put in their places, for further treatment.

The tobacco is perfectly stretched on the drums E by the aprons, which are wound tight, and is kept smooth and moist on the same.

The drums E and G, removed from the machine, are slipped upon the arbors *e e*, which are hung upon a frame or rack, I.

The person using the tobacco can gradually unwind the apron from E and wind it upon G, and remove one smooth leaf after another, as the same becomes unrolled.

Thus the tobacco is nicely kept in a roll, instead of the ordinary book, until used.

In place of the rotary knives *d* on the rod *c* I may use rotary cutters on the shaft D, or place cutting-rollers in front of the drums E.

Having thus described my invention,

I claim as new and desire to secure by Letters Patent—

1. The two unwinding drums G G, and the two aprons H H, combined with two winding drums, E E, arranged with a common supporting drum, C, for the purpose of forming an improved "booking" device.

2. The rolls E E having aprons H H, combined with revolving cutters placed between the said aproned rolls, for the purpose of taking out the stem and smoothing each side of the leaf immediately thereafter.

JOHN R. TUNNICLIFF.

Witnesses:
HENRY ROWN.
WM. CAMERON.